United States Patent
Cordell

(10) Patent No.: US 9,842,108 B2
(45) Date of Patent: Dec. 12, 2017

(54) AUTOMATED ESCALATION AGENT SYSTEM FOR LANGUAGE INTERPRETATION

(71) Applicant: Language Line Services, Inc., Monterey, CA (US)

(72) Inventor: Jeffrey Cordell, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 0 days.

(21) Appl. No.: 14/682,835

(22) Filed: Apr. 9, 2015

(65) Prior Publication Data

US 2016/0299887 A1    Oct. 13, 2016

(51) Int. Cl.
| | |
|---|---|
| *G06F 17/20* | (2006.01) |
| *G06F 17/28* | (2006.01) |
| *G06F 17/30* | (2006.01) |
| *G06Q 10/06* | (2012.01) |
| *G06Q 30/02* | (2012.01) |

(52) U.S. Cl.
CPC ...... *G06F 17/289* (2013.01); *G06F 17/30684* (2013.01); *G06Q 10/06* (2013.01); *G06Q 30/02* (2013.01)

(58) Field of Classification Search
CPC ............... G06F 17/289; G06F 17/2785; G06F 17/30654; G06F 17/275; G06F 17/28; G06F 17/2827; G06F 17/2854; G10L 15/18; G10L 15/005
USPC .............. 704/1–10, 235, 257, 277, E15.003, 704/E15.004

See application file for complete search history.

(56) References Cited

U.S. PATENT DOCUMENTS

| | | | | |
|---|---|---|---|---|
| 2008/0120087 A1* | 5/2008 | Scanlan | ................ | G06F 17/289 704/2 |
| 2008/0177528 A1* | 7/2008 | Drewes | ................ | G06F 17/289 704/2 |
| 2008/0243539 A1* | 10/2008 | Barish | .................. | G06F 19/321 705/2 |
| 2009/0287471 A1* | 11/2009 | Bennett | ................ | G06F 17/275 704/3 |
| 2010/0185434 A1* | 7/2010 | Burvall | ................ | G06F 17/289 704/3 |

(Continued)

*Primary Examiner* — Marivelisse Santiago Cordero
*Assistant Examiner* — Stephen Brinich
(74) *Attorney, Agent, or Firm* — Patent Ingenuity, P.C.; Samuel K. Simpson

(57) ABSTRACT

A system, computer program product, and process are provided for an automated escalation agent. A receiver receives a request for language interpretation from a first language to a second language. Further, a database stores data associated with a plurality of language interpreters associated with a computer implemented language interpretation platform. A processor searches the database and determines that no online language interpreter is available to perform language interpretation at a time of the request and that escalates the request to determine if an offline language interpreter is available to initiate the language interpretation within a predetermined time period measured from the time of the request. An automated escalation agent module searches the database according to notification criteria, and sends at least one notification including the request to a plurality of offline language interpreters that meet the notification criteria.

20 Claims, 5 Drawing Sheets

(56) References Cited

U.S. PATENT DOCUMENTS

2014/0156257 A1* 6/2014 Jephcott ............... G06F 17/289
 704/2
2014/0278345 A1* 9/2014 Koski .................. G06F 17/289
 704/2
2014/0297254 A1* 10/2014 Yeo ..................... G06F 17/289
 704/2

* cited by examiner

AUTOMATED ESCALATION AGENT SYSTEM FOR LANGUAGE INTERPRETATION

BACKGROUND

1. Field

This disclosure generally relates to the field of language interpretation. More particularly, the disclosure relates to computer implemented language interpretation platforms that provide language interpretation services.

2. General Background

Current computer implemented language interpretation platforms, which shall be referred to as language interpretation platforms, typically provide access to a variety of language interpreters that can provide language interpretation services through various forms of communication, e.g., voice, video, text, etc. A customer, e.g., a subscriber, of the language interpretation platform typically utilizes the language interpretation platform to obtain language interpretation for its users. For example, an emergency response entity may be a subscriber to the language interpretation platform. A user of the emergency response service provided by the emergency response entity may primarily speak a language other than English. Such a user is referred to as a Limited English Proficiency user ("LEP"). After the LEP calls the emergency response entity, the emergency response entity may connect to the language interpretation platform to obtain language interpretation services so that the emergency response personnel can effectively communicate with the LEP to provide emergency response services.

The language interpretation platform provides a language interpretation service by selecting an interpreter from a set of interpreters that have scheduled availability and meet the requirements of the subscriber and the LEP, e.g., the interpreter speaks English to converse with the subscriber's employee and Spanish to converse with the LEP. The language interpretation platform may have a certain number of scheduled available interpreters at a given moment that can perform language interpretation for English and a first LEP language and another number of scheduled available interpreters at that moment that can perform language interpretation for English and a second LEP language. As an example, at a particular time of a given day, the language interpretation platform may determine that one hundred interpreters are scheduled for work and are available to perform language interpretation for English and Spanish whereas only eighty interpreters are scheduled for work and are available to perform language interpretation for English and French.

Further, the language interpretation platform may determine that a language interpreter for a requested language may not be readily available. For example, the language interpretation service provider that provides language interpretation services through the language interpretation platform may not have a scheduled language interpreter for a less commonly spoken language that is available at a particular moment. As another example, the language interpretation service provider may have a significant number of language interpreters for a commonly spoken language, e.g., Spanish, that are scheduled for work at a particular moment, but that are all unavailable as a result of being busy providing language interpretation services for other subscribers.

Given such a request by an LEP, i.e., a request for language interpretation services that would require a language interpreter that is not readily available at a time requested, current language interpretation platforms typically contact a human escalation agent ("EA") through a human customer agent ("CA"). An available CA manually places a telephone call to an available human EA to inform the human EA that an LEP is requesting language interpretation for a particular language and that a language interpreter for that language is not readily available. The human EA then manually places telephone calls to various interpreters, which are not shown by the language interpretation platform to be currently available, to find out if an interpreter speaking that language can be immediately available for interpretation for the LEP during a language interpretation session via voice, video, text, etc. Even if the human EA is able to find such an interpreter, who was not scheduled for language interpretation services at that given moment, to be immediately available, the LEP would typically have to wait for an extended period of time, e.g., at least a few minutes, for the human CA to contact an available human EA and for the available human EA to place manual telephone calls to find the available language interpreter. Such an extended time period may be quite problematic in situations such as an emergency requiring emergency response assistance or other situations where an LEP needs to urgently communicate through a language interpreter.

With such little time to manually place telephone calls to find a language interpreter that is not scheduled to work at that moment, which can then be immediately available, the human EA often has to try to schedule a telephone call with the language interpreter for the LEP at a later time at which the language interpreter that was not scheduled to work can be available. The LEP may simply not be able to wait for a telephone call that is scheduled with a language interpreter for a later time.

Therefore, current language interpretation platforms utilize a cumbersome and inefficient human EA process. That process often limits the ability of current language interpretation platforms to provide effective language interpretation in time sensitive situations where immediate language interpretation is crucial for an LEP.

SUMMARY

A system, computer program product, and process are provided for an automated EA. A receiver receives a request for language interpretation from a first language to a second language. Further, a database stores data associated with a plurality of language interpreters associated with a computer implemented language interpretation platform. A processor searches the database and determines that no online language interpreter is available to perform language interpretation at a time of the request. Further, the processor escalates the request to determine if an offline language interpreter is available to initiate the language interpretation within a predetermined time period measured from the time of the request. An automated escalation agent module is utilized by the processor to search the database according to notification criteria. The automated escalation agent is then utilized by the processor to send at least one notification including the request to a plurality of offline language interpreters that meet the notification criteria.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1:
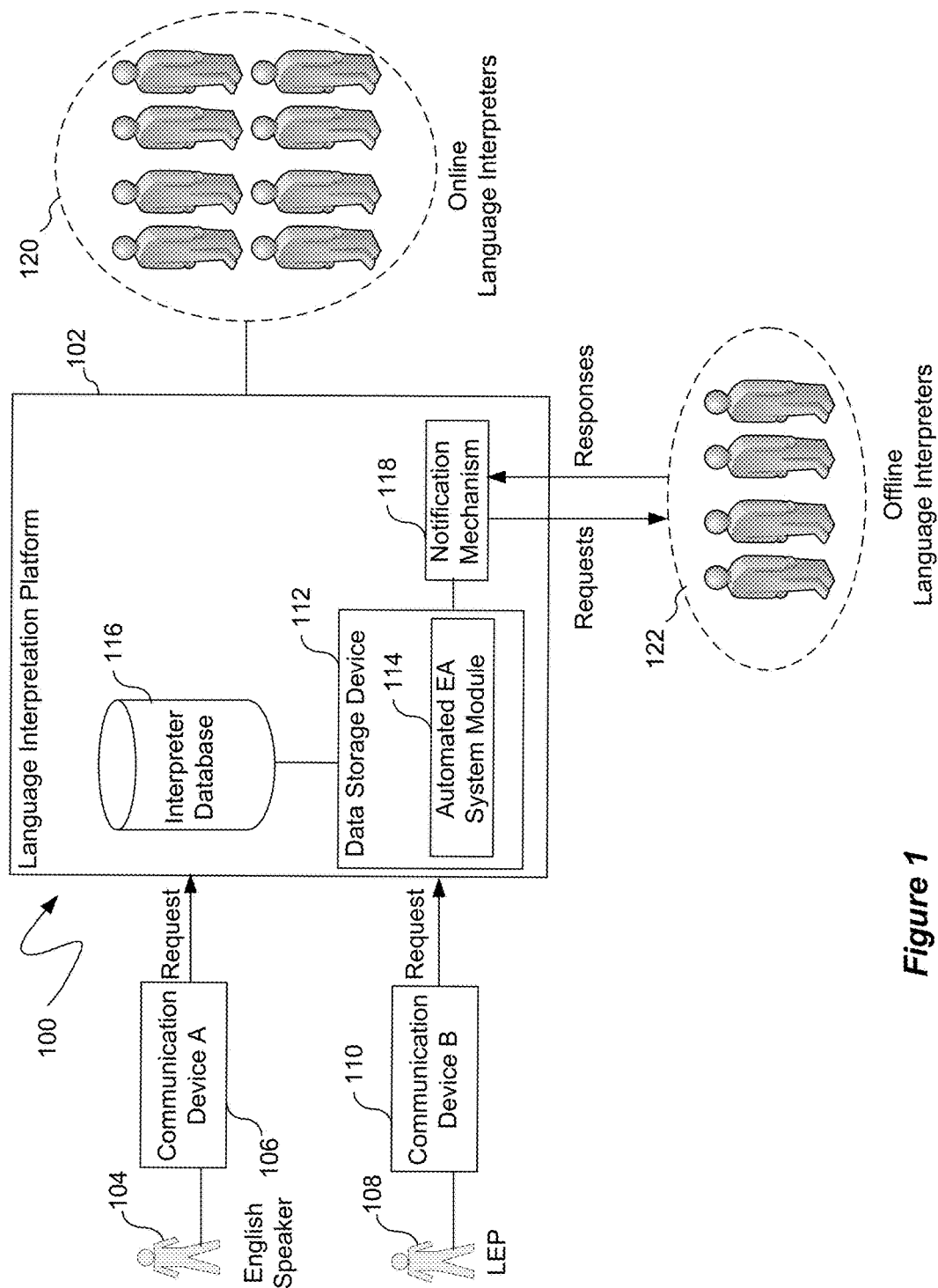
FIG. 1 illustrates an automated EA system configuration.

An automated EA system is provided for language interpretation. The automated EA system is utilized by a language interpretation platform to select a language interpreter that is offline, i.e., not connected to the language interpretation platform for the purpose of performing language interpretation work, at a time that is substantially similar to the time of a language interpretation request. The automated EA system selects the language interpreter that is offline to then be online, i.e., connected to the language interpretation platform, for the purpose of performing language interpretation work through a multi-channel notification mechanism. The multi-channel notification mechanism allows the language interpretation platform to communicate with offline language interpreters to determine availability through a variety of modes, e.g., strings of text, images, videos, voice, audio, multi-casting, etc. As an example, the notifications may be delivered through any of these modes as push notifications from the language interpretation platform to communication devices associated with the offline language interpreters. The automated EA system then uses the information received from responses to those notifications by the offline interpreters in addition to other information associated with the offline language interpreters to select the offline language interpreter for connection to the language interpretation platform to perform language interpretation for an LEP.

The automated EA system improves the functionality of the language interpretation platform by automatically generating notifications to offline language interpreters and automatically selecting a language interpreter based upon selection criteria in contrast with current language interpretation platforms that rely on the availability of a human EA to manually attempt to communicate with each offline interpreter. The current language interpretation platforms significantly delay the ability of the language interpretation platform to process a request for language interpretation from an LEP requesting a language interpreter for a language for which an online language interpreter is not currently available. The automated EA system significantly improves the processing speed of the processor or processors utilized by the language interpretation platform to process such a request as a result of the automated EA system replacing the previous human EA configuration. As an example, the automated EA system can simultaneously send a notification to offline language interpreters via multicasting and then quickly select an offline language interpreter based on the selection criteria, which may include response time speed of the offline language interpreters to the notification by the offline language interpreters. In contrast, the current human EA configuration would not practically allow for such simultaneous notification delivery and determination of response time since the current human EA configuration utilizes a human EA to call each offline language interpreter one by one in an inefficient manner. By increasing the processing speed of the processor or processors utilized by the language interpretation platform, the automated EA system effectively selects offline language interpreters so that the language interpretation platform can provide language interpretation services in a more time sensitive manner than that provided with current approaches.

FIG. 1 illustrates an automated EA system configuration 100. The automated EA system configuration 100 has a language interpretation platform 102. The language interpretation platform 102 is computer implemented by one or more computing devices. A computing device may be a server computer, personal computer, laptop computer, mobile device, smartphone, tablet device, set top box, etc. Speakers of different languages can connect to the language interpretation platform 102 to obtain language interpretation. For example, an English speaker 104 utilizing a communication device A 106, e.g., a telephone, smartphone, tablet device, etc., may want to have a conversation with an LEP 108 utilizing a communication device B 110. Either or both of the English speaker 104 and the LEP 108 may send the request for language interpretation services to the language interpretation platform 102. For example, the English speaker may be an employee of an entity that subscribes to the language interpretation service provided by the language interpretation platform. The English speaker 104 may have received a telephone call or other form of communication from the LEP 108 and is unable to communicate effectively with the LEP given the differing language proficiencies of the English speaker 104 and the LEP 108. The English speaker 104 may then place a request to the language interpretation platform 102 to obtain language interpretation services from a language interpreter to interpret the conversation between the English speaker 104 and the LEP 108. In one embodiment, the communication between the English Speaker 104 and the LEP 108 is routed to the language interpretation platform 102. Accordingly, the English speaker 104 only had to send request the request for language interpretation services. Alternatively, the LEP 108 could have sent the request for language interpretation services. The communication between the English Speaker 104 and the LEP 108 is routed to the language interpretation platform 102 such that the LEP 108 only had to send the request for language interpretation services. In another embodiment, the English speaker 104 and the LEP 108 each call in or communicate with the language interpretation platform 102 independently to connect to a conversation that includes a language interpreter. The examples utilizing an English speaker 104 and an LEP 108 are provided only as examples since other languages may be utilized. Further, more than two speakers of more than two differing languages may utilize the language interpretation platform 102 to obtain language interpretation services. The request may be provided to the language interpretation platform 102 through an automated system such as an interactive voice response ("IVR") system or through a live representative to which the request is directed by the language interpretation platform 102. The language interpretation platform 102 may have a receiver, input device, etc., for receiving the request.

Upon receiving a request for language interpretation services, the language interpretation platform 102 determines if an interpreter can be selected from a set of online language interpreters 120, i.e., a set of language interpreters that are connected to the language interpretation platform 102 at the time of the request. The language interpretation platform 102 stores the status of the various language interpreters that work for the language interpretation service provided by the language interpretation platform 102 in an interpreter database 116. Thus, the language interpretation platform 102 can retrieve data from the interpreter database 116 to determine the status of various language interpreters, e.g., online or offline, language proficiencies, etc. For instance, the LEP 108 may be proficient in Spanish. The language interpretation platform 102 determines from the interpreter database 116 that sixty of the online language interpreters 120 speak Spanish and are available. The language interpretation platform 102 can then route the request and communication, e.g., conversation between the English speaker 104 and the LEP 108, to a particular language interpreter from the online language interpreters 120 that is proficient in Spanish and is available.

If the language interpretation platform 102 determines that an interpreter cannot be selected from the set of online language interpreters 120, then the language interpretation platform 102 escalates the request to an automated EA system that is implemented via an automated EA system module 114, e.g., computer readable instructions, code, etc., that is stored on a data storage device 112. The language interpretation platform 102 utilizes one or more processors to perform instructions based upon the automated EA system module 114. The automated EA system determines from the interpreter database 116 what offline language interpreters should be notified according to a set of notification criteria and then utilizes a notification mechanism 118 to send notifications, e.g., push notifications, to a set of offline language interpreters 122 that meet the notification criteria. For example, the notification criteria may include language proficiency in the language spoken by the LEP 108, statistical availability at similar time periods to that of the request by the English speaker 104 and/or the LEP 108, etc. After retrieving data from the interpreter database 116 based upon a search utilizing the notification criteria, the automated EA system sends notifications to the set of offline language interpreters 122 as determined according to the notification criteria.

For instance, the LEP 108 may be proficient in a language that is not commonly spoken. The language interpretation platform 102 determines from the interpreter database 116 that none of the online language interpreters 120 speak that language. The language interpretation platform 102 then escalates the request to the automated EA system, which searches through the interpreter database 116 according to the notification criteria, e.g., language interpreters that speak the language that is not commonly spoken. The automated EA system then utilizes the notification mechanism 118 to send push notifications to the set of offline language interpreters 122 that meet the notification criteria.

After sending the push notifications, the notification mechanism 118 then waits for responses from the set of offline language interpreters 122 and forwards the responses to the automated EA system. The automated EA system then utilizes various selection criteria to select an interpreter from the set of offline language interpreters 122. The automated EA system can then utilize the notification mechanism 118 to send a notification to the selected interpreter to connect to the language interpretation platform 102 so that the language interpretation platform 102 can route the communication to the selected interpreter that is then online for the purpose of the language interpretation session. The language interpretation platform 102 may allow the selected interpreter to remain online only temporarily for the duration of the conversation between the English speaker 104 and the LEP 108. Alternatively, the language interpretation platform 102 may allow the selected interpreter to remain online even after the duration of the conversation between the English speaker 104 and the LEP 108 as an online language interpreter 120.

The selection criteria utilized by the automated EA system to select an offline language interpreter 122 can include response time to the request, location, etc. For example, the time in which the various offline language interpreters 122 respond may be a significant factor in a time sensitive conversation for an emergency response situation. Further, the location of the offline language interpreter 122 may also be a significant factor as the offline language interpreter 122 may be able to provide a higher quality language interpretation in a quiet location than a location that typically has considerable noise.

Figure 2A:
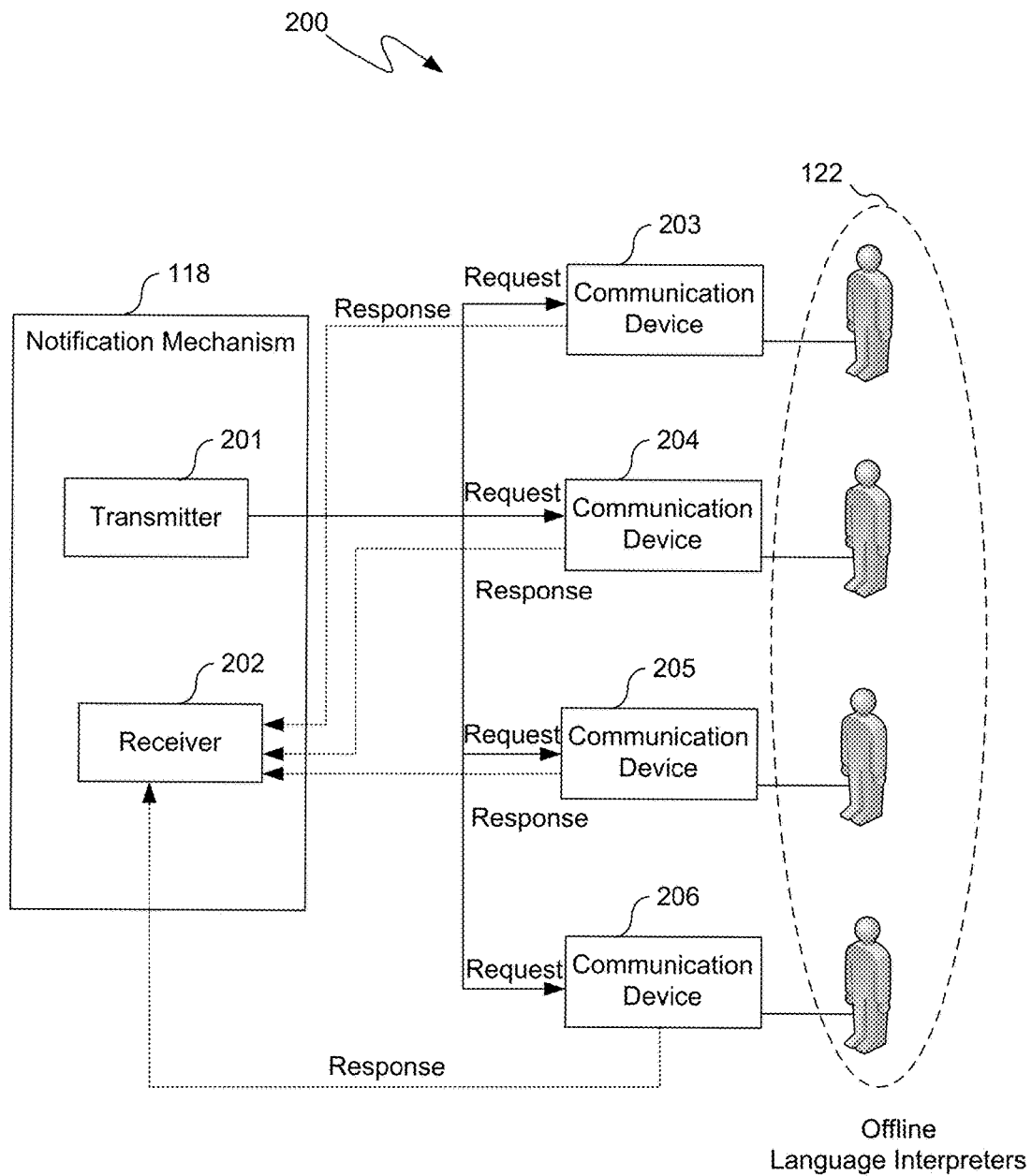
FIG. 2A illustrates a notification configuration that is utilized by the notification mechanism as illustrated in FIG. 1.

FIG. 2A illustrates a notification configuration 200 that is utilized by the notification mechanism 118 as illustrated in FIG. 1. The notification mechanism 118 may include a transmitter 201 and a receiver 202. The notification mechanism 118 may send the request for language interpretation services received from the English speaker 104 and/or the LEP 108 to the various communication devices 203, 204, 205, and 206 associated with each of the offline language interpreters 122. The receiver 202 then receives responses from the various communication devices 203, 204, 205, and 206 that indicate availability or lack of availability for a language interpretation session. The receiver 202 may not receive a response from all of the communication devices 203, 204, 205, and 206 as some of the offline language interpreters 122 may not be available to receive the notifications. The notification mechanism 118 then provides the responses to the automated EA system as provided in the discussion of FIG. 1 so that the automated EA system can utilize the selection criteria to select offline interpreters to perform the language interpretation.

If the notification mechanism 118 does not receive any responses within a predetermined time period, the notification mechanism 118 may inform the automated EA system so that the automated EA system can schedule a language interpretation session for the English speaker 104 and the LEP 108 at a subsequent time based upon subsequent availability of language interpreters that are proficient in the language spoken by the LEP 108. For example, the automated EA system can search the interpreter database 116 for language interpreters proficient in the language spoken by the LEP 108 that are scheduled to be online language interpreters at a time at which the English speaker 104 and the LEP 108 have availability.

In one embodiment, the notification mechanism 118 is a set of code that is stored on the data storage device 112 that is implemented by one or more processors of the language interpretation platform 102. In another embodiment, the notification mechanism 118 is a telecommunication device such as a modem that can transmit and/or receive information. Although the transmitter 201 and the receiver 202 are illustrated in FIG. 2A, a transceiver may be utilized instead.

Figure 2B:
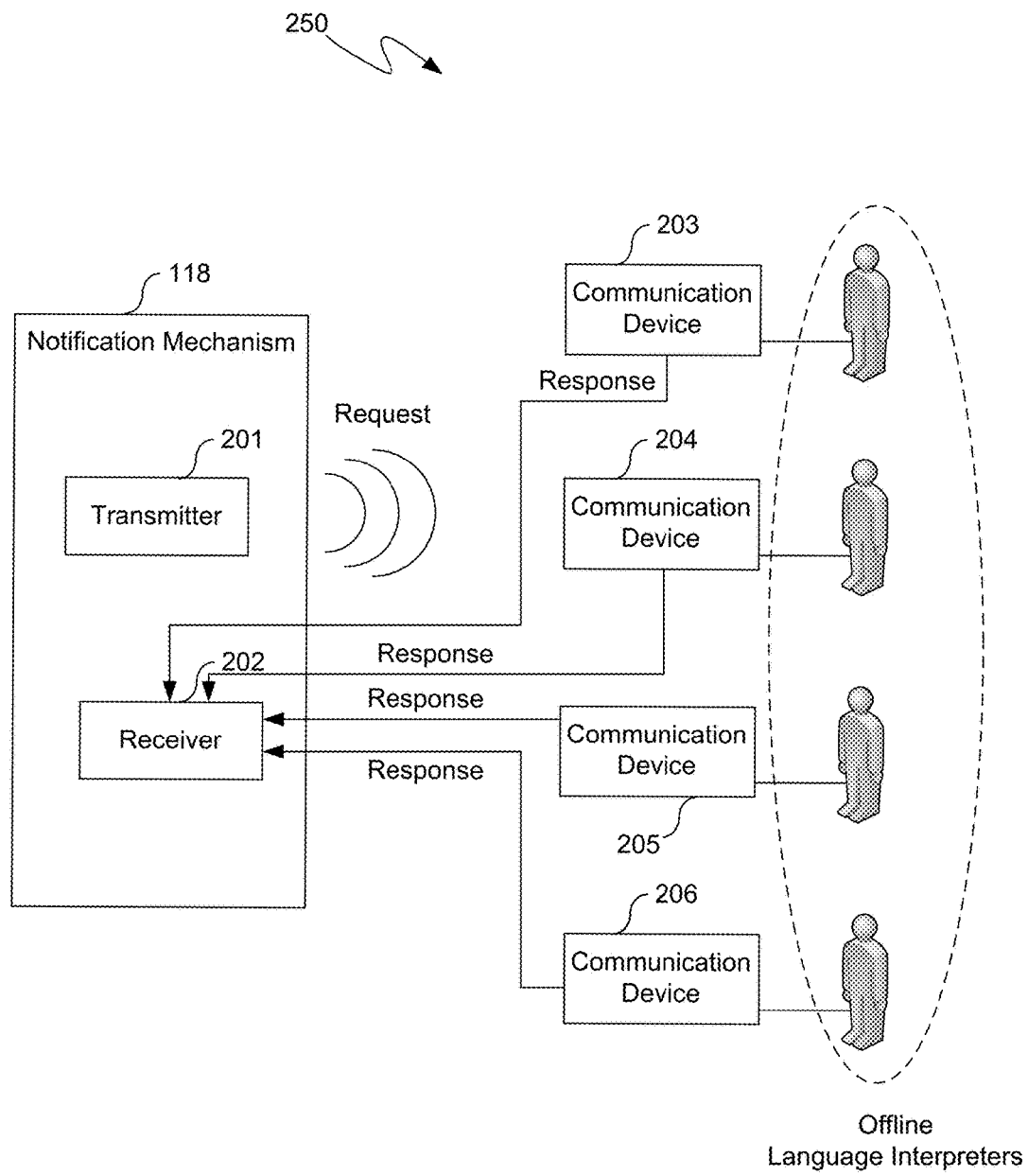
FIG. 2B illustrates an alternative notification configuration to the notification configuration illustrated in FIG. 2A.

FIG. 2B illustrates an alternative notification configuration 250 to the notification configuration 200 illustrated in FIG. 2A. The alternative notification configuration 250 sends the notification from the notification mechanism 118 to the various communication devices 203, 204, 205, and 206 via multi-casing. The notification mechanism 118 then receives or does not receive individual responses from the communication devices 203, 204, 205, and 206.

Figure 3:
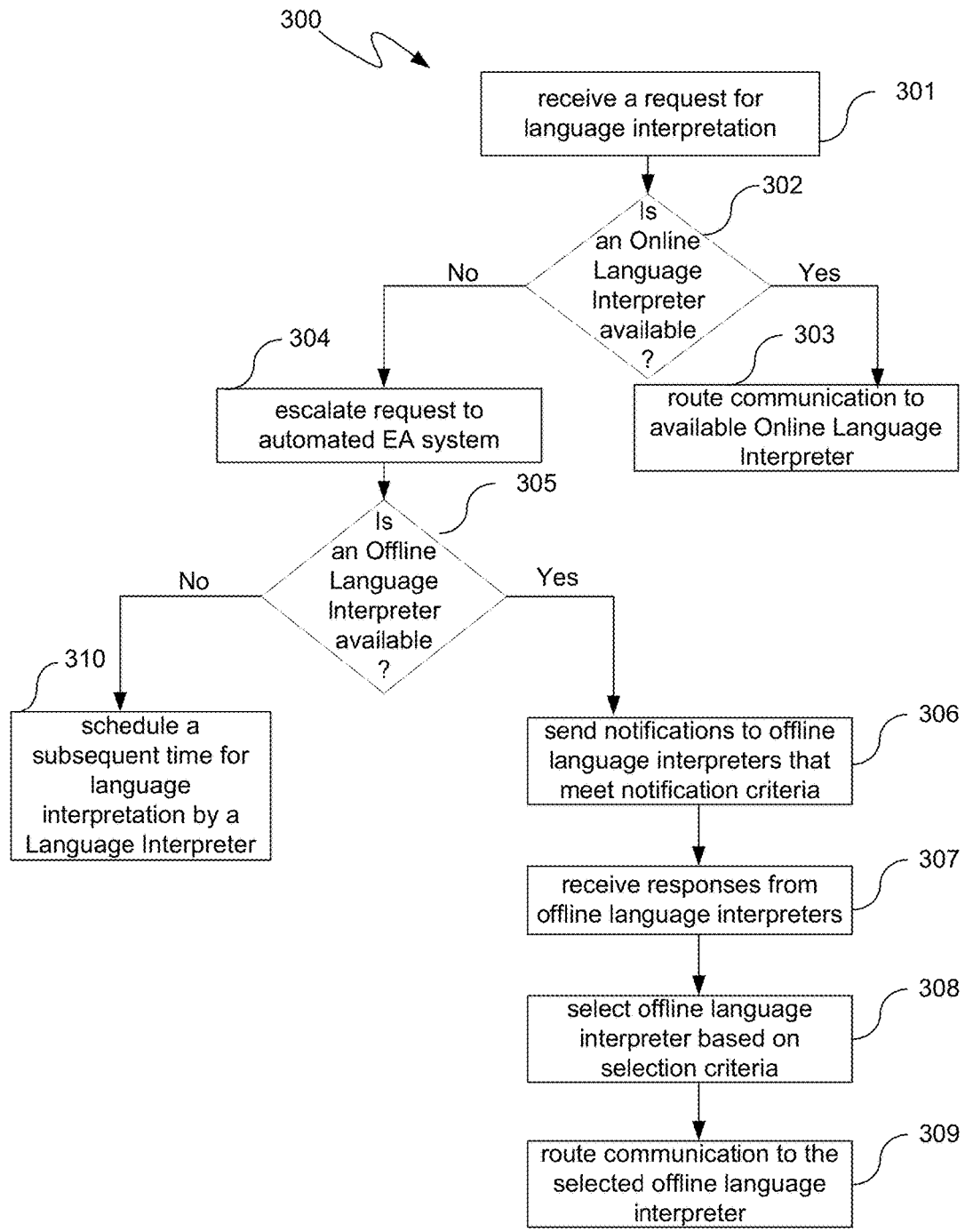
FIG. 3 illustrates a process that may be utilized by the automated EA system configuration illustrated in FIG. 1 to escalate a request for language interpretation.

FIG. 3 illustrates a process 300 that may be utilized by the automated EA system configuration illustrated in FIG. 1 to escalate a request for language interpretation. At a process block 301, the process 300 receives a request for language interpretation. The request may be received by either or both speakers speaking different languages. At a decision block 302, the process 300 determines if an online language interpreter that is proficient in both languages is available. Other criteria such as proficiency with certain terminology of different fields, e.g., medical, business, etc., may utilized for the determination at the decision block 302. If, at the decision block 302, the process 300 determines that an online language interpreter is available, the process 300 advances to a process block 303 and routes the communication, e.g., a telephone conversation, a video conference, etc., to the available online language interpreter so that the available online language interpreter may perform language interpretation for the speakers.

If, at the decision block 302, the process 300 determines that an online language interpreter is not available, the process 300 advances to a process block 304 and escalates the request to the automated EA system. The process 300 then advances to a decision block 305. At the decision block 305, the automated EA system determines if an offline language interpreter is available. If, at the decision block 305, the automated EA system determines that an offline language interpreter is available, the process 300 advances to a process block 306 to send notifications to offline language interpreters that meet notification criteria. At the process block 307, the process 300 receives responses from offline language interpreters to the notifications. Further, at the process block 308, the process 300 selects an offline language interpreter based on selection criteria. In addition, at a process block 309, the process 300 routes the communication to the selected offline language interpreter.

If, at the decision block 305, the process 300 determines that an offline language interpreter is not available, the process 300 advances to a process block 310 to schedule a subsequent time for language interpretation by a language interpreter. For example, the process 300 can receive available subsequent times from the speakers and schedule a language interpreter that can be available based on the availability of the speakers. In one embodiment, the language interpretation session is subsequently scheduled with an online language interpreter that is scheduled to have availability based on the availability of the speakers. In another embodiment, the language interpretation session is subsequently scheduled with an offline language interpreter that has been scheduled to connect to the language interpretation platform 102 for the purpose of the particular request.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium such as a computer readable storage device. The instructions may also be created using source code or any other known computer-aided design tool. A computer readable medium may be any medium capable of storing those instructions and include a CD-ROM, DVD, magnetic or other optical disc, tape, silicon memory, e.g., removable, non-removable, volatile or non-volatile, etc.

A computer is herein intended to include any device that has a general, multi-purpose or single purpose processor as described above. For example, a computer may be a personal computer, laptop computer, set top box, cell phone, smartphone, tablet device, portable media player, video player, or the like.

Figure 4:
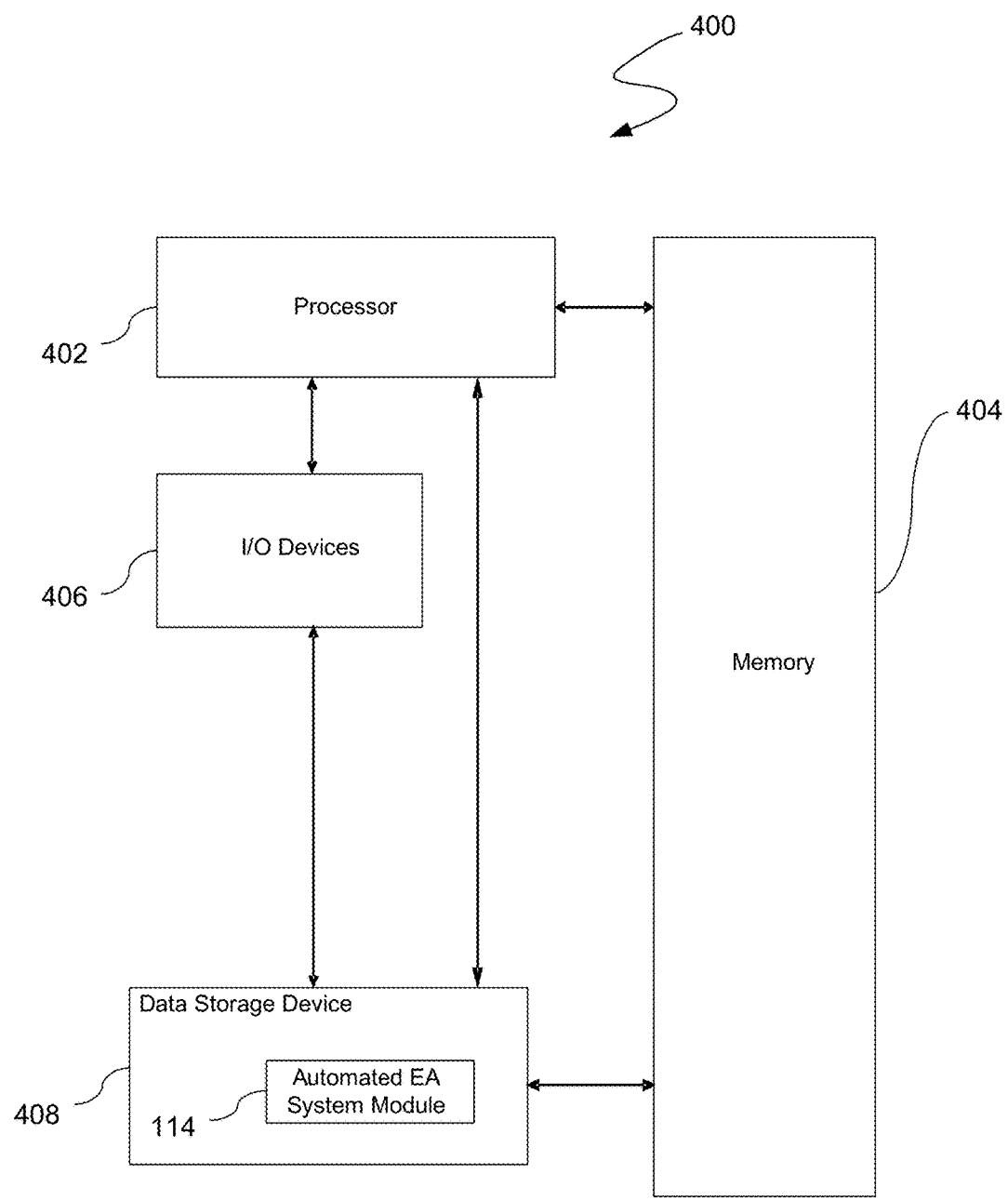
FIG. 4 illustrates a block diagram of a system that provides automated EA escalation.

FIG. 4 illustrates a block diagram of a system 400 that provides automated EA escalation. In one embodiment, the system 400 is implemented utilizing a general purpose computer or any other hardware equivalents. Thus, the system 400 comprises a processor 402, a memory 404, e.g., random access memory ("RAM") and/or read only memory (ROM), various input/output devices 406, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)), a data storage device 408, and the automated EA system module 114 on the data storage device 408.

The automated EA system module 114 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor 402 in the memory 404 of the computer. As such, the automated EA system module 114 (including associated data structures) of the present disclosure may be stored on a computer readable medium such as a computer readable storage device, e.g., RAM memory, magnetic or optical drive or diskette and the like. The system 400 may be utilized for a hardware implementation of any of the configurations provided herein.

It is understood that the computer program products, apparatuses, systems, and processes described herein may also be applied in other types of apparatuses, systems, and processes. Those skilled in the art will appreciate that the various adaptations and modifications of the embodiments of the compute program products, apparatuses, systems, and processes described herein may be configured without departing from the scope and spirit of the present computer program products, apparatuses, systems, and processes. Therefore, it is to be understood that, within the scope of the appended claims, the present computer program products, apparatuses, systems, and processes may be practiced other than as specifically described herein.

I claim:

1. A computer implemented language translation platform comprising:
    a receiver that receives a request for spoken language translation from a first spoken language to a second spoken language;
    a database that stores data associated with a plurality of spoken language translators associated with the computer implemented language translation platform;
    a processor that searches the database and determines that no online spoken language translator is available to perform the spoken language translation at a time of the request and that escalates the request to determine if an offline spoken language translator is available to initiate the spoken language translation within a predetermined time period measured from the time of the request; and
    an automated escalation agent module that, when performed by the processor, searches the database for a plurality of offline spoken language translators, simultaneously sends a notification to each of the plurality of offline spoken language translators, and selects an offline spoken language translator from the plurality of offline spoken language translators based on the fastest response times to the notification within the predetermined time period.

2. The computer implemented language interpretation platform of claim 1, wherein the automated escalation agent module that, when performed by the processor, further receives at least one response from the plurality of spoken offline language interpreters and selects a selected spoken offline language interpreter based upon one or more selection criteria.

3. The computer implemented language interpretation platform of claim 2, wherein the one or more selection criteria comprise availability of the offline spoken language interpreter to initiate the language interpretation within a predetermined time period measured from the time of the request.

4. The computer implemented language interpretation platform of claim 2, wherein the one or more selection criteria comprise a noise level of a location at which the spoken offline language interpreter is situated.

5. The computer implemented language interpretation platform of claim 1, wherein the notification criteria comprise spoken language proficiency of the first language and the second language.

6. The computer implemented language interpretation platform of claim 1, wherein the notification criteria comprise statistical availability at the time of the request.

7. The computer implemented language interpretation platform of claim 1, wherein the automated escalation agent module, when performed by the processor, sends the at least one notification via a notification mechanism.

8. The computer implemented language interpretation platform of claim 1, wherein the at least one notification is a string of text.

9. The computer implemented language interpretation platform of claim 1, wherein the at least one notification is an image.

10. The computer implemented language interpretation platform of claim 1, wherein the at least one notification is a video.

11. The computer implemented language interpretation platform of claim 1, wherein the at least one notification comprises audio.

12. The computer implemented language interpretation platform of claim 1, wherein the automated escalation agent module that, when performed by the processor, further searches, if no responses are received to the at least one notification within the predetermined time period, the database for an online spoken language interpreter that is available at a time subsequent to the predetermined time period and is proficient in the first language and the second language.

13. The computer implemented language interpretation platform of claim 12, wherein the automated escalation agent module that, when performed by the processor, further schedules a spoken language interpretation session for the time that is subsequent to the predetermined time period.

14. A computer program product comprising a computer readable device having a computer readable program stored thereon, wherein the computer readable program when executed on a computer causes the computer to:

receive, at a computer implemented language translation platform, a request for spoken language translation from a first spoken language to a second spoken language;
store, in a database at the computer implemented language translation platform, data associated with a plurality of spoken language translators associated with the computer implemented language translation platform;
search, at the computer implemented language translation platform, the database and determine that no online spoken language translator is available to perform the spoken language translation at a time of the request;
automatically escalate, at the computer implemented language translation platform, the request to determine if an offline spoken language translator is available to initiate the spoken language translation within a predetermined time period measured from the time of the request; and
search, at the computer implemented language translation platform, the database for a plurality of offline spoken language translators;
simultaneously send, from the computer implemented language translation platform, a notification to each of the plurality of offline spoken language translators; and
select, at the computer implemented language translation platform, an offline spoken language translator from the plurality of offline spoken language translators based on the fastest response times to the notification within the predetermined time period.

15. The computer program product of claim 14, wherein the computer is further caused to receive at least one response from the plurality of offline spoken language interpreters and selects a selected offline spoken language interpreter based upon one or more selection criteria.

16. The computer program product of claim 15, wherein the one or more selection criteria comprise availability of the offline spoken language interpreter to initiate the spoken language interpretation within a predetermined time period measured from the time of the request.

17. The computer program product of claim 15, wherein the one or more selection criteria comprise a noise level of a location at which the offline spoken language interpreter is situated.

18. The computer program product of claim 14, wherein the notification criteria comprise statistical availability at the time of the request.

19. The computer program product of claim 14, wherein the notification criteria is sent via a notification mechanism.

20. A method comprising:
receiving, at a computer implemented language translation platform, a request for spoken language translation from a first spoken language to a second spoken language;
storing, in a database at the computer implemented language translation platform, data associated with a plurality of spoken language translators associated with the computer implemented language translation platform;
searching, at the computer implemented language translation platform, the database and determining that no online spoken language translator is available to perform the spoken language translation at a time of the request;
automatically escalating, at the computer implemented language translation platform, the request to determine if an offline spoken language translator is available to initiate the spoken language translation within a predetermined time period measured from the time of the request;
searching, at the computer implemented language translation platform, the database for a plurality of offline spoken language translators;
simultaneously sending, from the computer implemented language translation platform, a notification to each of the plurality of offline spoken language translators; and
selecting, at the computer implemented language translation platform, an offline spoken language translator from the plurality of offline spoken language translators based on the fastest response times to the notification within the predetermined time period.

* * * * *